United States Patent Office 3,425,980
Patented Feb. 4, 1969

3,425,980
PEROXIDE CURED POLYETHYLENE COMPOSITIONS CONTAINING COATED CLAYS
Bernard O. Baum, Plainfield, N.J., assignor to Union Carbide Corporation, a corporation of New York
No Drawing. Filed Dec. 28, 1962, Ser. No. 247,834
U.S. Cl. 260—41
Int. Cl. C08f 45/72, 29/04, 29/34
29 Claims

ABSTRACT OF THE DISCLOSURE

Clays coated with non-reactive, non-acidic, oxygen containing organic compounds having boilings above 135° C. are used as fillers for peroxide cured ethylene polymers to obtain white and colorable polymer compositions of improved strength.

---

The invention relates to novel crosslinked, filled, ethylene polymers. In a particular aspect, the invention relates to novel white and colored ethylene polymer compositions produced by peroxide crosslinking of mixtures of ethylene polymers and organic-coated clay fillers.

Ethylene polymers, particularly polyethylene, have long been used commercially in the manufacture of formed and molded articles. These polymers cannot be used for a variety of applications for which they otherwise would be well suited, however, because of their brittleness and their inadequate physical properties at elevated temperatures, especially poor tensile strength and their inability to retain a formed shape. In order to remedy these and other deficiencies a variety of fillers have been added to ethylene polymers. Carbon black has been a useful filler, particularly when the ethylene polymer is crosslinked with peroxides. There are available, therefore, a number of crosslinked, carbon black-filled ethylene polymers which exhibit physical properties which are superior to those of the original polymer. Because these compositions are available only in black, however, there have been attempts to find fillers which improve the physical properties of crosslinked ethylene polymers in a manner similar to carbon black but which produce ethylene polymer compositions which are white and which can be colored if desired. It has been found that when various white or colorless inorganic fillers are used with peroxides the desired property improvements are not gained, and often the physical properties of the composition are less desirable than those of the original ethylene polymer. Thus crosslinked ethylene polymers are available only in black and are of limited attractiveness.

In accordance with this invention, it has now been discovered that ethylene polymers can be cured in the presence of organic peroxides and organic-coated clay filler materials to produce crosslinked compositions which have physical properties equal or superior to corresponding carbon black-filled crosslinked ethylene polymers and which are white or variously colorable by addition of colorants.

The term "ethylene polymer" as used in the present specification and claims is used to denote the normally solid homopolymers of ethylene as well as copolymers of ethylene with up to about 50 percent by weight of an olefinically unsaturated compound copolymerizable therewith such as, for example, compounds containing the ethylene linkage >C=C<, for example, vinyl halides, vinyl acetate, ethyl acrylate, monobutyl maleate, 2-ethylhexyl acrylate, N-methyl-N-vinyl acetamide, acrylic acid, isoprene, butadiene, bicycloheptene, bicyclopentadiene, and the like. Many other copolymerizable monomers which can be used in addition to these illustrative compounds are well known to the art. Preferred ethylene polymers in this invention are polyethylenes, ethylene/ethyl acrylate copolymers, and ethylene/vinyl acetate copolymers.

By the term "clay" as used in this invention is meant an inert, water-insoluble, naturally occurring sediment or sedimentary rock composed of one or more minerals and accessory compounds. Usually the clay is rich in hydrated silicates of aluminum, iron, or magnesium, or hydrated alumina or iron oxide. These silicates and related minerals exist predominantly in particles of colloidal or near colloidal size and they commonly develop plasticity when sufficiently pulverized and wetted. Examples of such clays include, but are not restricted to, glacial clays, kaolins, ball clays, fire clays, loess, adobe slip clay, bentonite, fullers earth, bleaching clays, and high alumina clays such as nodular clays bosley flint, bosley and diaspore clays, and bauxite clays. The clays can be crystalline, as are those of the kaolin group, for example kaolinite, dickite, and anauxite; of the montmorillonite group, for example bentonite clays such as beidellite, nontromite, hectonite, saponite, and sauconite; of the illite group; and of the attapulgite group; or non-crystalline, or amorphous, for example allophane and evansite.

The particle size of the clay used is not critical although clays having particle sizes ranging from 0.1 to 100$\mu$, and particularly from 0.1 to 10$\mu$, are preferred.

From about 5 to about 65 parts, and preferably from about 15 to about 50 parts, by weight organic-coated clay filler can be added per 100 parts by weight ethylene polymer in this invention. Because the filler is normally the least expensive component of the mixture it is preferred that the maximum amount of filler be added which still provides the complement of properties desired for a given application. It has been found, for example, that when low density polyethylene (i.e., ethylene homopolymer having a density of about 0.91 to 0.94) or ethylene copolymer, e.g. ethylene/ethyl acrylate copolymer, is the ethylene polymer employed from about 20 to about 50 parts filler per 100 parts ethylene polymer, by weight, is preferably added. When high density polyethylene (density of about 0.94–0.98) is the ethylene polymer used from about 20 to about 35 parts filler per 100 parts of the polymer, by weight, is preferably added.

It is critical that the clay filler be coated with an organic coating which is non-reactive with the clay filler to provide the benefits of this invention. The organic coating is a non-acidic, oxygen-containing hydrocarbon or halogenated hydrocarbon compound, preferably normally liquid, containing at least one hydrogen atom attached to an aliphatic carbon atom which is a non-primary carbon atom, i.e., is either a secondary or a tertiary carbon atom. To prevent excessive volatilization at normal compounding temperatures, i.e., about 125–135° C., the coating compound should have a boiling point above about 140° C. The following illustrative classes of compounds and examples of each are suitable for use as clay filler coatings in this invention: alcohols, particularly alkanols having from 5 to 8 carbon atoms inclusive, for example n-amyl and n-hexyl alcohols and isomers thereof; ethers and ether-alcohols, particularly those containing from 6 to 10 carbon atoms inclusive, for example hexyl ether, vinyl 2-ethylhexyl ether, methyl Cellosolve (ethylene glycol monomethyl ether) and diethyl Cellosolve (ethylene glycol diethyl ether); chlorinated ethers, for example dichloroethyl ether; esters, for example amyl acetate, di-n-butyl phthalate, and hexyl 2-ethyl hexanoate; aldehydes, for example ethylhexyl aldehyde and beta-phenylpropionaldehyde; ketones, for example diisobutyl ketone and butyrophenone; 1,3-diketones, for example acetylacetone and alpha-methoxyacetylacetone, 1,4-diketones, for example hexanedione-2,5 and nonanetrione-2,5,8; beta-ketoesters, such as ethylacetoacetate; polyethyleneglycolesters, for example diethyleneglycoldiacetate and triethyleneglycoldiacetate; polyethylene glycols, for example diethyleneglycol and triethylene glycol; glycols, for example pentanediol-1,5, heptanediol-2,4, and hexanediol-1,6; glycideethers, for example ethyleneglycoldiglycideether; and polyethylene glycolethers, for example diethyleneglycoldiethylether and diethyleneglycoldimethylether; and the like:

The method used to coat the clays with an organic coating for use in this invention is not critical as long as substantially complete coating is effected. One convenient and efficient coating method is to slurry the clay in an excess of a low boiling solvent, e.g. acetone, or acetone-methylene chloride, solution of the organic compound. An approximately 10 percent by weight solution of the organic coating in the solvent is conveniently used, although more dilute or more concentrated solutions can also be used if desired. The clay is slurried in the solution until it has been coated sufficiently to effect a solvent-free weight increase of from about 5 to about 25 percent, and preferably about 10 percent, based on the weight of the clay. The weight increase can be estimated by periodic filtration and weighing of the coated clay. Before use, the coated clay is dried and freed of solvent by heating for several hours at a temperature of about 105 to 115° C.

Organic peroxides which can be used as crosslinking agents in this invention are those compounds of carbon, hydrogen and oxygen which have the formula

$$R^1—O—O—R^2$$

wherein $R^1$ and $R^2$ are organic radicals which can be the same or different. $R^1$ and $R^2$ can be, preferably, hydrocarbon radicals, or organic radicals substituted with a great variety of substituents. Preferred classes of peroxides for use herein are alkyl peroxides, for example t-butyl peroxides; alkyl esters of organic peracids, for example t-butyl perbenzoate; and aryl substituted alkyl peroxides, for example dicumyl peroxide. Specific compounds illustrative of these and other useful classes of organic peroxides are:

Di-t-butyl peroxide, dimethyl peroxide, diethyl peroxide, t-butyl perbenzoate, t-butyl peracetate, dibenzoyl peroxide, bis(p-chlorobenzoyl)peroxide, cyclohexanone peroxide, diacetyl peroxide, hydroxyheptyl peroxide, dibutyryl peroxide, dipropionyl peroxide, dioctanoyl peroxide, dilauroyl peroxide, diisopropyl peroxydicarbonate, bis(heptafluorobutyryl)peroxide, bis(2,4-dichlorobenzoyl)peroxide, dicumyl peroxide, di-t-butyl diperphthalate, t-butyl peroxyisobutyrate, methyl ethyl ketone peroxide.

Of the foregoing organic peroxides the most desirable are dicumyl peroxide and t-butyl perbenzoate. Useful amounts of organic peroxide generally range from about 0.25 to 10 parts, and preferably from about 0.5 to about 4 parts, per 100 parts ethylene polymer, by weight.

The three components which produce the compositions of this invention, i.e., ethylene polymer, organic-coated clay filler, and organic peroxide, can be mixed to substantial homogeneity in any order and manner desired using conventional hot processing equipment well known to the plastics art. For example, batch type equipment such as a Banbury mixer or a two-roll mill can be used, or the mixture can be compounded in a screw extruder. Curing is effected by heating the mixture. A temperature above about 150° C. is normally used for a period of time which depends on the amount of material used and the decomposition temperature of the peroxide, but which generally is from about 10 minutes to 2 hours. Lower temperatures can also be used for longer periods of time.

The compositions of this invention, like other thermoplastic compositions, can contain lubricants, stabilizers, antioxidants, processing aids, pigments, and other additives if desired, in normal and conventional amounts. By adding colorants, it is important to note, it is now possible to produce filled, crosslinked ethylene polymers which cover the color spectrum yet withal provide those physical properties obtainable heretofore only with black carbon black-filled ethylene polymers.

In order to illustrate the invention more fully, the following examples, which should not be construed as limiting the invention, are described. All parts and percentages are by weight unless otherwise mentioned.

EXAMPLES

In the examples following, the ethylene polymer indicated was fluxed on a two roll mill at 110° C. The organic-coated clay filler and organic peroxide were milled in immediately after fluxing. Milling time was approximately five minutes including ten end passes to disperse the additives completely. The material was then sheeted and compression molded into plaques 20 mils thick. The plaques were cured in the mold at the indicated temperature and time.

Melt index values were obtained as follows: "1P" melt index is the weight in grams of polymer which flows through an orifice at 190° C. in 10 minutes under a ram pressure of 44 p.s.i. "10P" melt index is the weight in grams of polymer which flows through an orifice at 190° C. in 10 minutes under a ram pressure of 440 p.s.i. Melt index values recorded herein were measured in accordance with ASTM D–1238–57T.

Vicat heat distortion temperature is defined as the temperature at which a one millimeter indentation occurs when a needle having a point one millimeter in diameter and bearing a 1000 gram load is brought to bear on a sample.

Density was determined in accordance with ASTM D–392–38.

Tensile modulus and elongation were determined in accordance with ASTM D–412–51T.

Stress cracking resistance was measured as follows: a compression molded and cured polymer specimen 0.5 inch wide by 1.5 inches long and 125 mils thick was slit 20 mils deep along its length for 75 mils. The specimen was bent 180° and with 9 similar samples in a channel holder immersed in a non-ionic surfactant, nonyl phenoxy polyoxyethylene ethanol, at 50° C. Usually two channel holders were used, providing 20 specimens per test. Failure of a specimen was the appearance of a crack perpendicular to the slit. $F_{50}$ is the time of failure of 10 samples of the 20 (i.e., 50 percent failure).

Tensile impact strength was determined as follows: a dumbbell specimen ⅜″ x 2.5″ x 20 mils was mounted such that a high rate of loading was applied parallel to the long direction of the specimen. Results are reported as modulus of toughness in units of foot-pounds per cubic inch of specimen.

Tensile strength was determined in accordance with ASTM D–638–58T.

In all the examples the organic-coated clay was coated with the designated organic coating until an approximately 10 percent solvent-free weight increase was effected above the weight of the uncoated clay.

CLAY COATING

A 10 percent by weight solution of the organic coating in an acetone/methylene chloride mixture was prepared. Twenty grams of clay was slurried in 50 milliliters of the solution for a period of time sufficient to effect a weight increase of the clay of about 10 percent by weight. The coated clay was filtered and dried at 110° C. for three hours. The coated clay is then mixed with an ethylene polymer and an organic peroxide in proportions of about 5 to 65 parts coated clay and about 0.25 to 10 parts organic peroxide per 100 parts ethylene polymer, by weight.

Examples 1–3

Data obtained for Examples 1–3 are tabulated in Table I.

An organic-coated clay hereafter referred to as Filler

A (Mineral and Chemicals Corporation fine particle size [about 0.5–3.5 microns] kaolin coated with butyl phthalyl butyl glycollate) and an organic-coated clay hereafter referred to as Filler B (Georgia Koalin Corporation hydroxybutyl phthalate-coated koalin) were mixed in quantities of 50 parts per 100 parts polymer, by weight, with an ethylene/ethyl acrylate copolymer (8.6 percent by weight combined ethyl acrylate, 6 melt index). Three parts peroxide per 100 parts of the ethylene/ethyl acrylate copolymer, by weight, were added and mixed in. The mixture was then cured as a 20 mil compression molded plaque for 7 minutes at 165° C.

Four controls were run: Control 1, in which neither organic-coated clay filler nor dicumyl peroxide was added to the polymer; Control 2, in which no organic-coated clay filler was added; Control 3, in which no dicumyl peroxide was added; and Control 4, in turn which carbon black and dicumyl peroxide were added, are shown for comparison. A comparison of the controls demonstrates that crosslinking the unfilled polymer raises tensile impact strength and lowers melt index to 0. Addition of Filler A greatly lowers tensile impact strength and elongation, and raises tensile modulus, providing a product of cheese-like consistency. In Example 2, peroxide crosslinking of the copolymer filled with Filler A effects an increase in impact and elongation to the level of the crosslinked but filled copolymer and maintains the high tensile modulus. Similar excellent properties are obtained when Filler B and t-butyl perbenzoate are substituted for Filler A and dicumyl peroxide, respectively, in Examples 1 and 3.

dicumyl peroxide per 100 parts of the copolymer, by weight, and cured as described in Examples 1–3.

Control 5 shows the effect of formulation using Filler A, unstripped (per se), but no peroxide. Control 6 employs uncoated Filler A which had been stripped of its organic coating; on peroxide crosslinking it can be seen that using the organic coating-stripped filler, the properties of the resulting composition show no improvement over the filled uncrosslinked composition of Control 5. Example 5 shows the effect of recoating the stripped filler with butyl phthallyl butyl glycollate, the original coating; upon crosslinking the properties displayed by this sample are again equivalent to those of Example 4.

Examples 6–21 illustrate representative organic compounds which can be used to coat clay fillers for use herein. In Examples 6–21 and in Controls 7–11, Filler A, stripped of its coating with methyl ethyl ketone as described above, was coated with a variety of organic materials and then used at 50 parts filler per 50 parts ethylene/ethyl acrylate copolymer, by weight, and 3 parts dicumyl peroxide per 100 parts copolymer, by weight. Curing was effected in each case by heating the mixture in the mold for 7 minutes at 165° C.

Controls 7–9 show that acidic compounds do not provide the advantages of clay filler coatings of this invention. Controls 10–11 illustrate the necessity for materials containing at least one hydrogen atom attached to a secondary or tertiary carbon atom, i.e., aromatic and aliphatic compounds which contain only primary hydrogen atoms are inoperative as filler coatings herein.

TABLE I

| Example Number | Filler (50 parts/100 parts copolymer) | Peroxide | Parts Peroxide 100 parts Copolymer | 10P Melt Index | Tensile Impact, ft. lbs./cu. in. | Tensile Modulus, p.s.i. | Vicat Temperature, ° C. | Elongation, percent |
|---|---|---|---|---|---|---|---|---|
| Control 1 | None | None |  | 220 | 572 | 8,690 | 78 | 610 |
| Control 2 | do | Dicumyl peroxide | 3 | 0 | 754 | 8,549 | 78 | 510 |
| Control 3 | A | None |  | 164 | 23 | 27,000 | 80 | 36 |
| Control 4 | Carbon black | Dicumyl peroxide | 3 | 0 | 265 | 22,100 | 93 | 95 |
| 1 | B | do | 3 | 0 | 255 | 32,700 | 90 | 280 |
| 2 | A | do | 3 | 0 | 239 | 22,500 | 83 | 480 |
| 3 | A | t-Butyl perbenzoate | 3 | 0 | 260 | 21,600 | 87 | 370 |

TABLE II

| Example Number | Coating on Stripped Filler A | 10P Melt Index | Tensile Impact, ft. lbs./cu. in. | Tensile Modulus, p.s.i. | Elongation, percent | Vicat Temperature, ° C. |
|---|---|---|---|---|---|---|
| Control 5 | Filler A per se (no peroxide) | 164 | 23 | 27,000 | 80 | 36 |
| 4 | Filler A per se | 0 | 238 | 22,500 | 480 | 81 |
| Control 6 | None | 111 | 17 | 24,500 | 81 | 78 |
| 5 | BPBG [1] | 0 | 196 | 24,300 | 360 | 91 |
| Control 7 | Phthalic Acid | 190 | 19 | 24,600 | 56 |  |
| Control 8 | Formic Acid | 161 | 32 | 22,100 | 23 |  |
| Control 9 | Adipic Acid | 172 | 41 |  | 49 |  |
| Control 10 | p-t-Butyl Phenol | 159 | 17 |  | 71 |  |
| Control 11 | Benzaldeyde | 160 | 27 |  | 92 |  |
| 6 | Amyl Alcohol | 6 | 97 |  |  |  |
| 7 | 2,4-heptanediol | 12 | 116 | 21,400 | 112 |  |
| 8 | Polyethylene Glycol | 0 | 176 | 22,100 | 210 |  |
| 9 | Diethylene Glycol | 19 | 83 | 18,500 | 96 |  |
| 10 | Methyl Cellosolve | 6 | 270 | 26,300 | 323 |  |
| 11 | Hexyl Ether | 3 | 116 |  |  |  |
| 12 | Diethyl Cellosolve | 29 | 61 |  |  |  |
| 13 | Vinyl 2-ethylhexyl Ether | 11 | 97 | 18,800 | 156 |  |
| 14 | Dichloroethyl Ether | 37 | 54 |  |  |  |
| 15 | Amyl Acetate | 1.4 | 121 |  | 410 |  |
| 16 | Di-n-Butyl Phthalate | 2.6 | 217 | 20,300 | 123 |  |
| 17 | Hexyl 2-ethylhexanoate | 13 | 17 | 17,500 |  |  |
| 18 | Ethylhexylaldehyde | 0 | 171 |  |  |  |
| 19 | beta-Phenylpropionaldehyde | 41 | 42 |  |  |  |
| 20 | Diisobutyl Ketone | 3 | 147 |  |  |  |
| 21 | Butyrophenone | 16 | 81 |  |  |  |

[1] Butyl phthallyl butyl glycollate.

Examples 4–21

Data obtained for Examples 4–21 are tabulated in Table II. In these examples, a variety of organic coatings were applied to Filler A which had been stripped of its organic coating by reflux for 24 hours in methyl ethyl ketone. These organic-coated fillers were then mixed at 50 parts filler per 50 parts, by weight, ethylene/ethyl acrylate copolymer having a melt index of 6 and containing 8.6 percent by weight combined ethyl acrylate and 3 parts

Examples 22–23

Data obtained for Examples 22–23 are tabulated in Table III.

In Control 12, an unfilled low density polyethylene (density of 0.92, 1P melt index of 1.9) was prepared both with and without a peroxide crosslinking agent. The 10P melt index of the crosslinked sample was lowered to 0, impact strength was greatly increased, and modulus and percent elongation were lowered.

In Control 13, the low density polyethylene described for Control 12 was filled at 50 parts per 50 parts polymer, oxide-crosslinked sample and "Not XL" means that the sample is uncrosslinked.

TABLE III

| Example Number | Filler | 10P Melt Index | | Vicat temperature, °C. | | Tensile Impact, ft. lbs./cu. in. | | Elongation, percent | | Tensile Modulus, p.s.i. | |
|---|---|---|---|---|---|---|---|---|---|---|---|
| | | XL | Not XL | XL | Not XL | XL | Not XL | XL | Not XL | XL | Not XL |
| Control 12 | None | 0 | 140 | 90 | 90 | 840 | 170 | 260 | 520 | 14,100 | 16,200 |
| Control 13 | Carbon Black | 0 | | 90 | 102 | 257 | 16 | 75 | 19 | 31,500 | 48,000 |
| 22 | Filler B | 0 | | 87 | 98 | 239 | 0 | 160 | 12 | 32,700 | 55,800 |
| 23 | Filler A | 0 | 45 | 91 | 95 | 150 | 21 | 140 | 10 | 29,600 | 51,200 |
| Control 14 | SiO$_2$ | 38 | | 90 | 90 | 22 | 19 | 11 | 23 | 55,900 | 57,700 |
| Control 15 | Al$_2$O$_3$ | 64 | | 89 | 90 | 33 | 16 | 42 | 11 | 40,800 | 40,400 |
| Control 16 | Silica | 2 | | 95 | 86 | 42 | 18 | 16 | 5 | 59,800 | 89,800 | by weight. When a peroxide is not added tensile impact strength and percent elongation are greatly reduced, tensile modulus is increased, and Vicat softening temperature remains unchanged compared with a peroxide-crosslinked sample of the same system. Similar results were obtained with uncrosslinked low density polyethylene plus the commercially available organic-coated clays described earlier as Fillers A and B (uncrosslinked Examples 22–23).

Crosslinked Examples 22–23 show the effect of peroxide crosslinking of low density polyethylene and organic-coated commercial clay filler mixtures. The polyethylene described for Control 12 was used and the filler as indicated in the examples, at 50 parts per 50 parts polymer, by weight. Three parts dicumyl peroxide were added per 100 parts polymer, by weight. A 20 mil plaque was prepared for testing by compression molding for 10 minutes at 170° C. It can be seen in Table III that 10P melt index is 0, and impact strength and elongation are greatly increased over the uncrosslinked, similarly filled systems. In addition, Vicat temperature and tensile modulus are raised.

Controls 14–16 demonstrate the inapplicability of uncoated inorganic fillers in this invention. In Control 14, silicon dioxide as an impalpable powder is the filler used; in Control 15, 200 mesh aluminum trioxide; and in Control 16 very fine silica (particle size 50 microns, Columbia Southern). No property improvement is obtained with these fillers by crosslinking.

It is shown in Table III that use of organic-coated clay fillers in crosslinked ethylene polymer systems provides at least the same reinforcing action as is provided by similar carbon black-filled systems. The fillers of this invention are superior in that they yield compositions in which percent elongation is not as greatly reduced after peroxide crosslinking as well as the fact that they are not black but white and can thus be colored as desired.

In Table III the abbreviation "XL" refers to the per-

Example 24

The reinforcement advantage of peroxide crosslinking of 100 parts low density polyethylene with 50 parts bentonite (montmorillonite clay) coated with polyethylene glycol, by weight, is shown in Example 24. Data collected for this example and Control 17, wherein an uncoated bentonite is used, are tabulated in Table IV. In both the example and the Control 3 parts dicumyl peroxide per 100 parts polymer, by weight, were used. Twenty mil plaques were cured at 170° C. for 10 minutes.

TABLE IV

| Example Number | Filler (50/100 parts Polyethylene) | Coating | 10P Melt Index | Tensile Impact, ft. lbs./cu. in. | Elongation, percent |
|---|---|---|---|---|---|
| Control 17 | Bentonite | None | 27 | 13 | 23 |
| 24 | do | Polyethylene Glycol | 0 | 126 | 82 |

Examples 25–35

In Examples 25–35 and Controls 18–19 the filler used is the organic-coated clay Filler A, described in Examples 1–3. The ethylene polymer used is low density polyethylene having a density of 0.92 and a 1P melt index of 1.9. Twenty mil plaques prepared for the tests were cured at a temperature of 1770° C. for 10 minutes.

The effect of varying the percentage dicumyl peroxide used as a crosslinking agent in filled low density polyethylene systems is shown in Examples 25–28. In Control 18, no peroxide is used. Data collected for these experiments are tabulated in Table V–A. It can be seen that as the percentage dicumyl peroxide increases melt index decreases, impact increases up to 3 parts peroxide per 100 parts polymer, by weight, and then remains constant, percent elongation increases and modulus drops.

Using 3 parts dicumyl peroxide per 100 parts low density polyethylene, Examples 29–35 show the effect on the properties of the crosslinked compositions of this invention when percentage filler is increased. In Control 19 no peroxide was added. Data for these experiments are collected in Table V–B. It can be seen that as the parts filler per 100 parts of this polymer increase from 0 to 60, impact and elongation increase and modulus decreases. Parts of filler greater than 60 cause a rapid decrease in impact and elongation.

The preferred parts of filler when low density polyethylene is the ethylene polymer used is demonstrated to be from about 20 to about 50 parts filler per 100 parts polymer, by weight.

TABLE V–A

| Example Number | Parts Filler A/ 100 Parts Polymer | Parts Dicumyl Peroxide/ 100 Parts Polymer | 10P Melt Index | Tensile Impact, ft. lbs./cu. in. | Percent Elongation | Tensile Modulus |
|---|---|---|---|---|---|---|
| Control 18 | 50 | 0 | 45 | 21 | 10 | 51,200 |
| 25 | 50 | 0.25 | 18 | 41 | 30 | 47,200 |
| 26 | 50 | 1 | 0 | 161 | 131 | 26,400 |
| 27 | 50 | 3 | 0 | 150 | 140 | 29,600 |
| 28 | 50 | 10 | 0 | 157 | 180 | 21,800 |

TABLE V-B

| Example Number | Parts Filler A/ 100 Parts Polymer | Parts Dicumyl Peroxide/ 100 Parts Polymer | 10P Melt Index | Tensile Impact, ft. lbs./ cu. in. | Percent Elongation | Tensile Modulus |
|---|---|---|---|---|---|---|
| Control 19 | 0 | 3 | 0 | 840 | 260 | 14,100 |
| 29 | 5 | 3 | 0 | 376 | 249 | 16,700 |
| 30 | 10 | 3 | 0 | 286 | 227 | 19,300 |
| 31 | 20 | 3 | 0 | 197 | 197 | 25,100 |
| 32 | 35 | 3 | 0 | 188 | 170 | 30,600 |
| 33 | 50 | 3 | 0 | 150 | 140 | 29,600 |
| 34 | 60 | 3 | 0 | 123 | 128 | 32,400 |
| 35 | 75 | 3 | 0 | 41 | 50 | 37,100 |

Examples 36–37

In Table VI are collected data for Examples 36–37.

High density polyethylene (density 0.957, melt index 0.3), a peroxide (referred to in Table VI as Peroxide D), 2,5-dimethyl-2,5-di-t-butyl peroxy hexane, and antioxidant (referred to in Table VI as Antioxidant T), 4,4-thio-bis-6-t-butyl-m-cresol, and organic-coated clay Filler A (described in Examples 1–3) were mixed and cured at a temperature of 170° C. for 10 minutes. Twenty-five parts Filler A were used per 73.35 parts polymer, by weight, in Example 36, and 50 parts Filler A per 48.9 parts polymer, by weight, in Example 37. It can be seen in Example 36 that stress crack resistance is excellent (in comparison with Control 20, which is both unfilled and uncrosslinked), tensile strength is good, impact strength and elongation, although less than in crosslinked, unfilled Control 20, are still good, and modulus is increased. Example 37 demonstrates that at substantially equal parts of filler and polymer the composition is brittle; the stress crack resistance test could not be run because the samples broke while being bent for the test. Using high density polyethylene, therefore, from about 20 to about 35 parts filler per 100 parts polymer, by weight, will be the preferred amount of filler.

TABLE VII

| | 10P Melt Index | Tensile Impact, ft. lbs./cu. in. | Elongation, percent |
|---|---|---|---|
| Example 38 | 0 | 196 | 360 |
| Control 22 | 152 | 17 | 41 |

TABLE VI

| | Control 20 | Control 21 | Example 36 | Example 37 |
|---|---|---|---|---|
| High Density Polyethylene, parts by weight | 100 | 97.8 | 73.35 | 48.9 |
| Peroxide D, parts by weight | 0 | 1.0 | 1.0 | 1.0 |
| Antioxidant T, parts by weight | 0 | 0.2 | 0.15 | 0.1 |
| Filler A, parts by weight | 0 | 0 | 25 | 50 |
| Melt Index, at 440 p.s.i., dg./min | 27 | <0.01 | <0.01 | <0.01 |
| Density | 0.957 | 0.955 | 1.11 | 1.35 |
| Tensile Modulus, p.s.i.×10⁻³ | 137 | 88 | 137 | 217 |
| Tensile Impact Strength, ft. lbs./cu. in | 108 | 198 | 149 | 18 |
| Stress Cracking Resistance, F₅₀ (hours) | 22 | >504 | >504 | (¹) |
| Tensile Strength, p.s.i | 4,211 | 3,427 | 3,525 | 3,718 |
| Elongation, percent | 65 | 180 | 70 | 22 |

¹ Not run.

Example 38

Example 38 demonstrates that peroxide crosslinking of ethlyene polymers filled with organic-coated clays produces compositions possessing lower melt indices and improved properties only if the clay is coated, but not mixed in (Control 22). In this example, a quantity of the commercial organic-coated clay Filler A (described in Examples 1–3) was stripped of its coating by reflux for 24 hours in methyl ethyl ketone. Half of the stripped clay was recoated with its original coating. Two formulations were prepared for comparison, one containing 3 parts dicumyl peroxide and 50 parts of the stripped filler per 100 parts low density polyethylene by weight, plus an equivalent amount of the organic coating which had been removed (Control 22), the other containing 3 parts dicumyl peroxide and 50 parts of recoated clay per 100 parts low density polyethylene, by weight (Example 38). Both samples were compression molded for one hour at 150° C. From the data recorded in Table VII it can be seen that organic coating plus clay (rather than organic-coated clay) is inoperative in this invention.

What is claimed is:

1. White, colorable crosslinked ethylene polymer composition which comprises the curing reaction product of a mixture of from about 5 to about 65 parts by weight of a clay filler substantially completely coated with from about 5 to 25 percent, based on the weight of said clay, of an organic coating wherein said organic coating is a non-reactive non-acidic, oxygen-containing organic compound having a boiling point above about 140° C. and containing at least one hydrogen atom attached to an aliphatic non-primary carbon atom and from about 0.25 to about 10 parts by weight of an organic peroxide crosslinking agent having the formula $$R^1\text{---}O\text{---}O\text{---}R^2$$

wherein $R^1$ and $R^2$ are organic radicals, per 100 parts by weight of an ethylene polymer.

2. White, colorable crosslinked ethylene polymer composition claimed in claim 1 wherein said ethylene polymer is polyethylene.

3. White, colorable crosslinked ethylene polymer composition claimed in claim 1 wherein said ethylene polymer is ethylene/ethyl acrylate copolymer.

4. White, colorable crosslinked ethylene polymer composition which comprises the curing reaction product of a mixture of from about 20 to about 50 parts by weight of a clay filler substantially completely coated with about 10 percent, based on the weight of said clay, of an organic coating wherein said organic coating is a non-reactive non-acidic, oxygen containing organic compound having a boiling point above about 140° C. and containing at least one hydrogen atom attached to an aliphatic non-primary carbon atom and from about 0.5 to about 4 parts by weight of an organic peroxide crosslinking agent having the formula $$R^1\text{---}O\text{---}O\text{---}R^2$$

wherein $R^1$ and $R^2$ are organic radicals, per 100 parts by weight of an ethylene polymer.

5. White, colorable crosslinked ethylene polymer composition claimed in claim 4 wherein said ethylene polymer is polyethylene.

6. White, colorable crosslinked ethylene polymer composition claimed in claim 4 wherein said ethylene polymer is ethylene/ethyl acrylate copolymer.

7. White, colorable crosslinked ethylene polymer claimed in claim 5 wherein said organic-coated clay filler comprises from about 20 to about 35 parts per 100 parts by weight high density polyethylene.

8. White, colorable crosslinked polymer composition claimed in claim 4 wherein said organic coating is amyl alcohol.

9. White, colorable crosslinked polymer composition claimed in claim 4 wherein said organic coating is 2,4-heptanediol.

10. White, colorable crosslinked polymer composition claimed in claim 4 wherein said organic coating is polyethylene glycol.

11. White, colorable crosslinked polymer composition claimed in claim 4 wherein said organic coating is diethylene glycol.

12. White, colorable crosslinked polymer composition claimed in claim 4 wherein said organic coating is ethylene glycol monomethyl ether.

13. White, colorable crosslinked polymer composition claimed in claim 4 wherein said organic coating is hexyl ether.

14. White, colorable crosslinked polymer composition claimed in claim 4 wherein said organic coating is ethylene glycol diethyl ether.

15. White, colorable crosslinked polymer composition claimed in claim 4 wherein said organic coating is vinyl 2-ethylhexyl ether.

16. White, colorable crosslinked polymer composition claimed in claim 4 wherein said organic coating is dichloroethyl ether.

17. White, colorable crosslinked polymer composition claimed in claim 4 wherein said organic coating is amyl acetate.

18. White, colorable crosslinked polymer composition claimed in claim 4 wherein said organic coating is di-n-butyl phthalate.

19. White, colorable crosslinked polymer composition claimed in claim 4 wherein said organic coating is hexyl 2-ethylhexanoate.

20. White, colorable crosslinked polymer composition claimed in claim 4 wherein said organic coating is ethylhexylaldehyde.

21. White, colorable crosslinked polymer composition claimed in claim 4 wherein said organic coating is beta-phenylpropionaldehyde.

22. White, colorable crosslinked polymer composition claimed in claim 4 wherein said organic coating is diisobutyl ketone.

23. White, colorable crosslinked polymer composition claimed in claim 4 wherein said organic coating is butyrophenone.

24. White, colorable crosslinked polymer composition claimed in claim 4 wherein said organic coating is an hydroxyalkyl phthalate.

25. White, colorable crosslinked polymer composition claimed in claim 4 wherein said organic coating is butyl phthallyl butyl glycollate.

26. White, colorable crosslinked polymer composition claimed in claim 1 containing a colorant.

27. Method of producing color variable crosslinked ethylene polymer composition which includes the steps of mixing to substantial homogeneity an ethylene polymer with from about 5 to about 65 parts by weight of a clay filler substantially completely coated with from about 5 to 25 percent, based on the weight of said clay, of an organic coating wherein said organic coating is a non-reactive non-acidic oxygen-containing organic compound having a boiling point above about 140° C. and containing at least one hydrogen atom attached to a non-primary carbon atom and from about 0.25 to about 10 parts by weight of an organic peroxide crosslinking agent having the formula:

$$R-O-OR$$

wherein R is an organic radical, per 100 parts by weight of said ethylene polymer, and curing the mixture by subjection to heat.

28. Method of producing color variable crosslinked ethylene polymer composition which includes the steps of mixing to substantial homogeneity from about 20 to about 50 parts by weight of a clay filler substantially completely coated with about 10 percent, based on the weight of said clay, of an organic coating wherein said organic coating is a non-reactive non-acidic oxygen-containing organic compound having a boiling point above about 140° C. and containing at least one hydrogen atom attached to an aliphatic non-primary carbon atom and from about 0.5 to 4 parts by weight of an organic peroxide crosslinking agent having the formula $$R-O-O-R$$

wherein R is an organic radical, per 100 parts by weight of said ethylene polymer, and curing the mixture by subjection to heat.

29. A white, colorable crosslinked ethylene polymer composition as claimed in claim 1 wherein said ethylene polymer is an ethylene/vinyl acetate copolymer.

References Cited

UNITED STATES PATENTS

| | | | |
|---|---|---|---|
| 2,692,869 | 10/1954 | Pechukas | 260—41.5 |
| 3,014,885 | 12/1961 | Jordan | 260—41 |
| 3,206,419 | 9/1965 | Pritchard et al. | 260—23 |
| 2,857,355 | 10/1958 | Iller | 260—41 |
| 2,888,424 | 5/1959 | Precopio et al. | 260—41 |
| 3,160,598 | 12/1964 | Delfosse | 106—308 X |
| 3,227,657 | 1/1966 | Hoden et al. | 106—308 X |
| 3,239,481 | 3/1966 | Meier et al. | 260—41 |

OTHER REFERENCES

Natta et al., Vulcanisation and Elastomeric Properties of Ethylene Propylene Copolymers, in Rubber and Plastics Age, January 1961, pp. 56–57.

MORRIS LIEBMAN, *Primary Examiner.*

J. H. DERRINGTON, *Assistant Examiner.*

U.S. Cl. X.R.

106—308